US008824417B2

(12) United States Patent
Keller et al.

(10) Patent No.: US 8,824,417 B2
(45) Date of Patent: Sep. 2, 2014

(54) METHODS AND APPARATUSES FOR SINGLE RADIO VOICE CALL CONTINUITY (SRVCC) FROM CS TO LTE

(75) Inventors: Ralf Keller, Würselen (DE); Magnus Hallenståhl, Täby (SE); Magnus Olsson, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 140 days.

(21) Appl. No.: 13/128,269

(22) PCT Filed: Nov. 10, 2009

(86) PCT No.: PCT/EP2009/064944
§ 371 (c)(1), (2), (4) Date: Jun. 14, 2011

(87) PCT Pub. No.: WO2010/052343
PCT Pub. Date: May 14, 2010

(65) Prior Publication Data
US 2011/0249652 A1   Oct. 13, 2011

Related U.S. Application Data

(60) Provisional application No. 61/112,815, filed on Nov. 10, 2008.

(51) Int. Cl.
*H04W 36/00* (2009.01)
*H04W 88/14* (2009.01)
*H04W 80/10* (2009.01)
*H04W 48/08* (2009.01)

(52) U.S. Cl.
CPC ...... *H04W 36/0022* (2013.01); *H04W 36/0033* (2013.01); *H04W 88/14* (2013.01); *H04W 80/10* (2013.01); *H04W 48/08* (2013.01)
USPC ........... 370/331; 370/354; 370/355; 370/356; 370/352

(58) Field of Classification Search
CPC .................. H04W 36/0022; H04W 36/0033; H04W 88/14; H04W 80/10; H04W 48/08
USPC ........................ 370/331, 352, 354, 355, 356
See application file for complete search history.

(56) References Cited

U.S. PATENT DOCUMENTS

| 2007/0254625 | A1* | 11/2007 | Edge ........................... 455/404.1 |
| 2010/0111002 | A1 | 5/2010 | Xu et al. |
| 2011/0044327 | A1* | 2/2011 | Mahdi et al. .................. 370/352 |

FOREIGN PATENT DOCUMENTS

| CN | 101115028 A | 1/2008 |
| CN | 101227647 A | 7/2008 |

(Continued)

OTHER PUBLICATIONS

3rd Generation Partnership Project. 3GPP TS 23.216, V1.1.1 (Apr. 2008). 3rd Generation Partnership Project; Technical Specification Group Services and System Aspects; Single Radio Voice Call Continuity (SRVCC); Stage 2 (Release 8), Apr. 2008.

(Continued)

*Primary Examiner* — Omer S Mian
(74) *Attorney, Agent, or Firm* — Coats & Bennett, PLLC (57) ABSTRACT

A method for a call control node (MSC Server) enhanced for Single Radio Voice Call Continuity (SRVCC) allowing for a session transfer of a call involving a User Equipment (UE) of a handover party from a circuit switched (CS) access towards a target packet switched (PS) access is provided, the call involving said handover party and another party, said call being anchored in an Service Centralization and Continuity Application Server (SCC AS) of the IP-Multimedia-Subsystem (IMS), the method comprising the steps of receiving (202) an indication that the User Equipment (UE) is SRVCC capable, receiving (204) an indication of an address and port the UE is going to use for speech media over PS, providing (206) the UE with an indication of the address and port to be used towards the other party (remote end), deciding (208) to perform a SRVCC from CS access to said target PS access, sending (210) a relocation request for a bearer to a respective mobility management node (SGSN/MME), including said address and said port of the UE to be used for creating a PDP context, and sending (212) a handover command message to the UE, sending (214) a request for a "Forward Session Transfer" to the SCC AS, using the address and the allocated port to be used for media to construct a respective SDP.

30 Claims, 8 Drawing Sheets

(56) References Cited

FOREIGN PATENT DOCUMENTS

| | | |
|---|---|---|
| CN | 101227733 A | 7/2008 |
| CN | 101291454 A | 10/2008 |
| EP | 1983796 A1 | 10/2008 |
| WO | 2008125067 A1 | 10/2008 |

OTHER PUBLICATIONS

3rd Generation Partnership Project. 3GPP TS 23.216, V8.1.0 (Sep. 2008). 3rd Generation Partnership Project; Technical Specification Group Services and System Aspects; Single Radio Voice Call Continuity (SRVCC); Stage 2 (Release 8), Sep. 2008.

3rd Generation Partnership Project. 3GPP TS 23.882, V8.0.0 (Sep. 2008). 3rd Generation Partnership Project; Technical Specification Group Services and System Aspects; 3GPP System Architecture Evolution: Report on Technical Options and Conclusions (Release 8), Sep. 2008.

* cited by examiner

METHODS AND APPARATUSES FOR SINGLE RADIO VOICE CALL CONTINUITY (SRVCC) FROM CS TO LTE

BACKGROUND

Mobile networks are currently evolving from pure circuit switched (CS) networks towards IP based networks. In doing so, they integrate and are and by that integrated into IP based infrastructures that are is also used for the Internet, the World Wide Web and the datacom industry in general.

With this trend mobile networks closely follow the evolution steps of the wireline networks, where VoIP via DSL access or via WLAN access is existing technology today.

Mobile operators of mobile communication networks, such as GSM/WCDMA operators, that install IMS (IP Multimedia Subsystem) networks and offer IMS services want to make these IMS services available also to GSM/WCDMA subscribers. Hereto, calls from and to this group of (GSM/WCDMA) subscribers need to be routed through the IMS network in order to reach a respective IMS service engine offering the respective service. This concept is called also known as IMS Centralized Services (ICS). The IMS centralized Centralized Services work item in $3^{rd}$ Generation Partnership Program (3GPP) targets at using the Circuit Switched access for access to IMS services, see 3GPP Technical Specification TS 23.292, and is complemented by IMS Service Continuity, see 3GPP TS 23.237.

In parallel to the ICS trend the packet core is evolving (Evolved Packet Core, EPC) as part of the Evolved Packet System (EPS), supporting Evolved UTRAN (eUTRAN or E-UTRAN) (or LTE Long Term Evolution, as it is also called) as new radio access network. As part of this discussion, work on single radio voice call continuity (SRVCC) is ongoing in 3GPP SA2 (see 3GPP TS 23.216), within said framework would allow for enabling to transfer an IMS voice call from EPS to CS. It is envisioned that SR-VCC is combined with ICS for an IMS centralized solution supporting also SRVCC from UTRAN/GERAN CS to E-UTRAN.

Figure 1A:
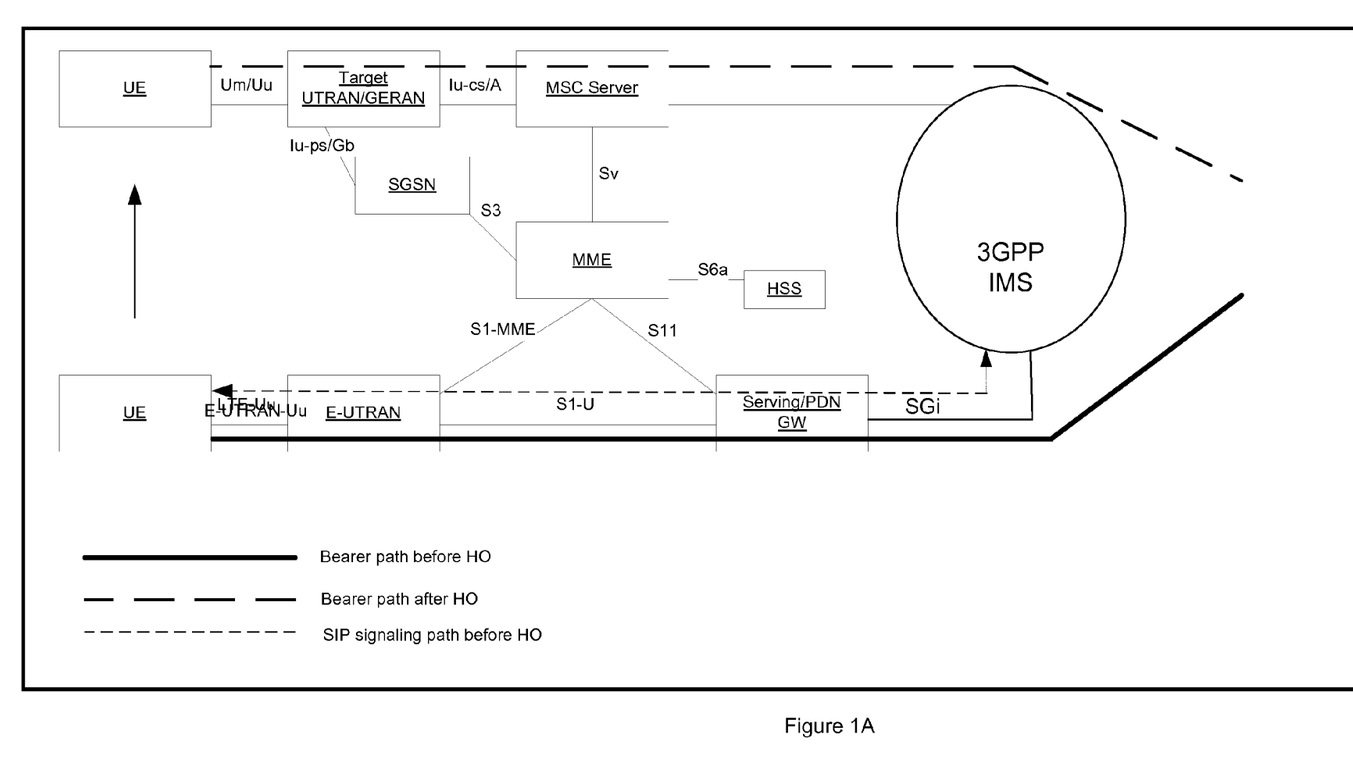
FIG. 1A shows an exemplary SRVCC architecture figure.

In the FIG. 1A displaying an exemplary architecture figure, an MSC Server which is enhanced for SRVCC has either an ISUP (ISDN User Part) or an SIP (Session Initiate Protocol) interface.

Within said architecture a transfer of an IMS voice call from EPS/LTE towards GERAN/UTRAN CS is conceptually shown. In the lower part, the User Equipment UE being connected via the E-UTRAN towards the IMS network via the Serving and PDN gateway is shown. This User Equipment is now to be transferred (as indicated by the arrow on the left side) towards the UTRAN/GERAN CS in which it would be connected to the IMS network via the Target UTRAN/GERAN and the MSC-Server. A HSS (Home Subscriber Server) is only shown for completeness but are not necessary for the understanding of the invention.

Figure 1B:
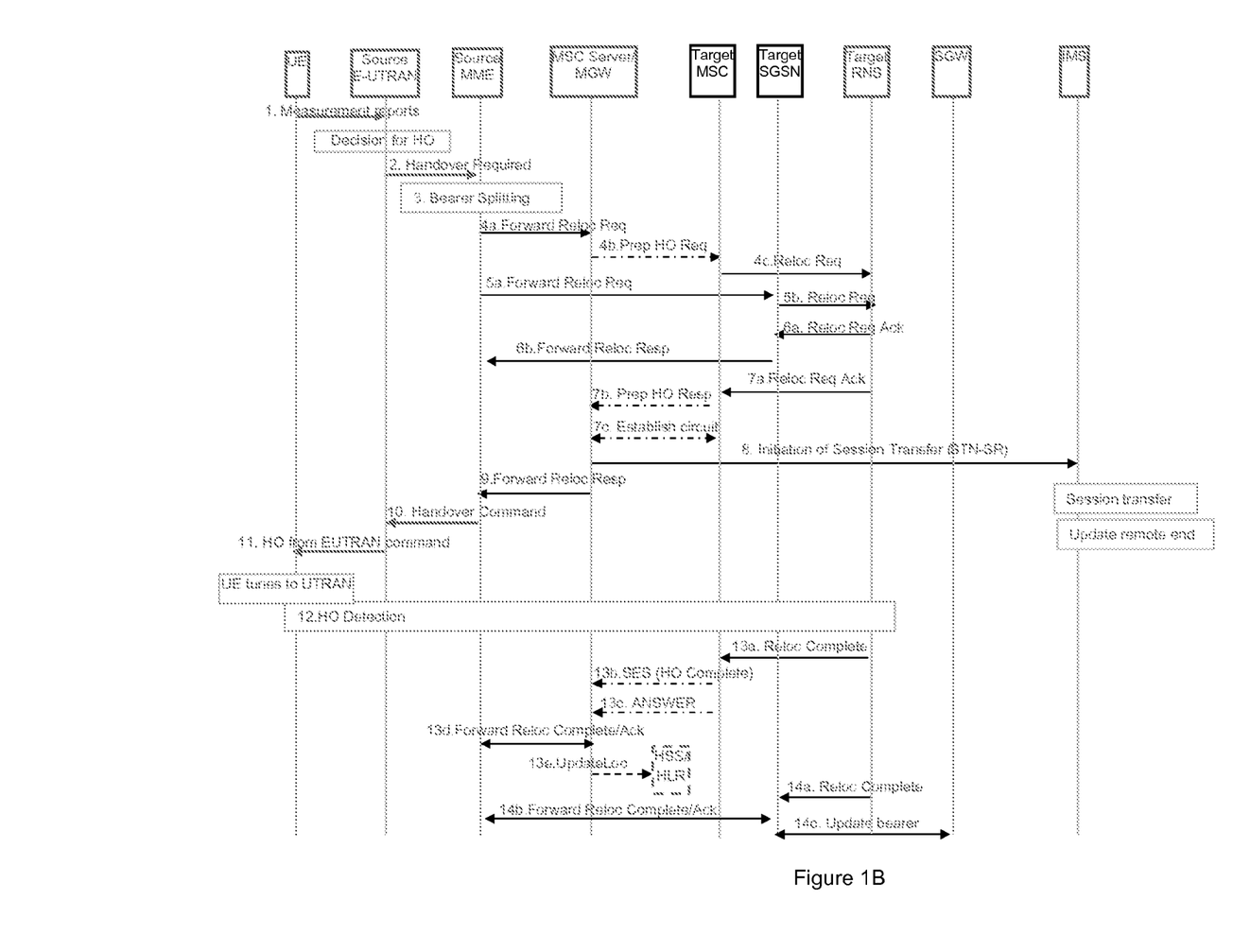
FIG. 1B shows an exemplary flowchart illustrating a handover from an LTE/EPS system (E-UTRAN) towards a UTRAN/GERAN CS system.

FIG. 1B displaying an exemplary flowchart, illustrating a handover from an LTE/EPS system (E-UTRAN) towards a UTRAN/GERAN CS system as exemplified in the architecture of FIG. 1A.

Within said scheme due to some reasons, e.g. measurement reports as indicated in step 1 of FIG. 1B lead to decision in the source, i.e. in the E-UTRAN (lower portion of FIG. 1B) to initiate a handover towards a target, i.e. UTRAN/GERAN CS in the upper portion of FIG. 1B. The relocation request is sent towards the MSC-Server which than prepares the Target network (Target MSC, Target SGSN, Target RAN (UTRAN/GERAN)) for the handover (steps 4.-.7). Thereafter in a step 8, the session transfer towards the IMS is initiated. After step 8, the Service Centralization and Continuity Application Server (SCC AS) in the IMS (an SCC AS correlates Service Control Signaling and CS Bearer Control Signaling and presents session to IMS) has performed the session transfer for speech media, i.e., the remote end within the IMS has been updated to send speech media to the Media Gateway (MGW) controlled by the MSC Server enhanced for SRVCC and not longer over E-UTRAN to the User Equipment (UE).

Similar procedure allows a SRVCC from UTRAN PS to UTRAN/GERAN CS. In this case RNC would correlate to eNodeB and SGSN correlate to MME above.

While the eNode B as part of the Source UTRAN has decided in step 2 to perform a handover (decision to HO) (which causes the Mobility Management Entity or the Mobility Management Node (MME or SGSN) to send a Forward Relocation Request towards the MSC Server), it is allowed that the eNode B part of the Source UTRAN may decide later that it is not longer required to perform handover, e.g., due to newer measurement reports. In such a case and in case of a Packet Switched (PS) handover, the eNodeB would inform the MME accordingly (or the NodeB would inform the SGSN) and the PS handover procedure would be stopped and all bearers would remain in EPS.

However, when the eNode B would decide to not require handover after the session transfer has been initiated by the MSC Server enhanced for SRVCC (step 9), the UE would stay in E-UTRAN but the speech media would already be send to the target MSC Server enhanced for SRVCC. Thereby the user would not be able to continue his phone call, since the media and the related SIP control signaling would be directed towards the target MSC Server/MGW and not via E-UTRAN.

The process described above pertains to proposals for a session transfer from a CS access towards a LTE access for IMS calls that had been initiated via LTE access, particularly handed over to a CS access and then handed over back to LTE access. However, this has been considered as too limited. So far, no solution is known which would allow for a handover of CS to PS accessed calls, wherein the call has been originated in the CS domain or call has been handed over to CS domain. A solution is needed which works also for calls being initiated via CS access.

SUMMARY

One or more embodiments herein provide a return direction from CS to PS for calls that have originally been established in the CS domain or particularly handed over to CS domain from PS domain (using current standardized SRVCC procedure). For example, some embodiments provide a return direction from CS to E-UTRAN or LTE (Long Term Evolution), or to High Speed (HS) or UTRAN HSPA (High Speed Packet Access). The MSC Server enhanced for SRVCC may instruct the MME or SGSN (in case of E-UTRAN) or SGSN (in case of UTRAN HSPA) to support the session transfer from CS to the target PS access.

In the context of this application, the term "MSC Server" may particularly denote a MSC and/or a MSC Server.

For that purpose a method is envisaged for a call control node (MSC Server) enhanced for Single Radio Voice Call Continuity (SRVCC) allowing for a session transfer of a call involving a User Equipment (UE) of a handover party from a circuit switched (CS) (particularly transferring-out leg) access towards a target packet switched (PS) (particularly transferring-in leg, further particularly PS E-UTRAN/UTRAN HSPA) access, the call involving said handover party and another party, said call being anchored in an Service Centralization and Continuity Application Server (SCC AS) of the IP-Multimedia-Subsystem (IMS).

Within said method the call control node receives an indication that the User Equipment is SRVCC capable. Furthermore, the call control node receives an indication of an address and port the UE is going to use for speech media over PS. The call control node provides the UE with an indication of the address and port to be used towards the other party (particularly a remote end).

Once the call control node within the source network decides to perform a SRVCC from CS access to said target PS access, the call control node sends a relocation request for a bearer to a respective mobility management node (SGSN/MME), including said address and said port of the UE to be used for creating a PDP (Packet Data Protocol) context (particularly (including) a VoIP bearer). The call control node sends a handover command message to the UE and sends a request for a "Forward Session Transfer" to the SCC AS, using the address and the allocated port to be used for media to construct a respective SDP (Session Description Protocol).

On the other hand also a method for a mobility management node (SGSN/MME) allowing for a session transfer of a call involving a User Equipment (UE) of a handover party from a circuit switched (CS) (particularly transferring-out leg) access towards a target packet switched (PS) (particularly transferring-in leg, further particularly PS E-UTRAN/UTRAN HSPA) access, the call involving said handover party and another party, said call being anchored in an Service Centralization and Continuity Application Server (SCC AS) of the IP-Multimedia-Subsystem (IMS), is proposed.

Within said method, the mobility management node receives from a call control node such as a MSC Server enhanced for SRVCC handling said session transfer a message indicating a relocation request for a bearer, said message including an address and a port to be used for creating a PDP context (particularly (including) a VoIP bearer).

Depending on whether having received a relocation request directly from an node (RNC/BSC) of the Radio Access Network (RAN), the call control node may look up whether there is one or more bearers used over PS access, and if there are one or more bearers, the call control node may wait for the relocation request from the respective RAN providing said one or more bearers.

Furthermore, the mobility management node creates a PDP context (particularly (including) a VoIP bearer) and initiates the setup of a bearer. The mobility management node furthermore performs a communication of a forward relocation request with a further mobility management node, including said PDP context, and the mobility management node sends a relocation response to the call control node such as the MSC Server.

In particular the mobility management node sends forward relocation request towards a further mobility management node, including said PDP context.

In particular the mobility management node receives forward relocation request from a further mobility management node, including said PDP context.

In the context of this application, "creating a PDP context (particularly (including) a VoIP bearer) and initiating the setup pf a bearer" may to comprise or be equivalent to "creating a PDP context with VoIP characteristics".

Furthermore, inventive apparatuses are disclosed embodying the invention as described. In addition, various embodiments providing further enhancements are provided in the dependent claims.

DETAILED DESCRIPTION

In the following description of the invention, two accesses, a transferring-out access and a transferring-in access, are described while not being fixed to a specific number of accesses.

Although the invention is described at first with respect to a revocation initiated by an MSC-S, the proposed solution in its generality can also be applied to the UE.

For the following, the following terminology is used: source and target refer to the transfer process before respectively after completion of the transfer. In the same manner, a transferring-in leg and a transferring-out leg refer to the path of media and/or signaling from and to the UE (to be) handed over after completion respectively before the completion of the session transfer while the remote leg is the leg of the session towards the other party involved in a call respectively session.

Figure 2A:
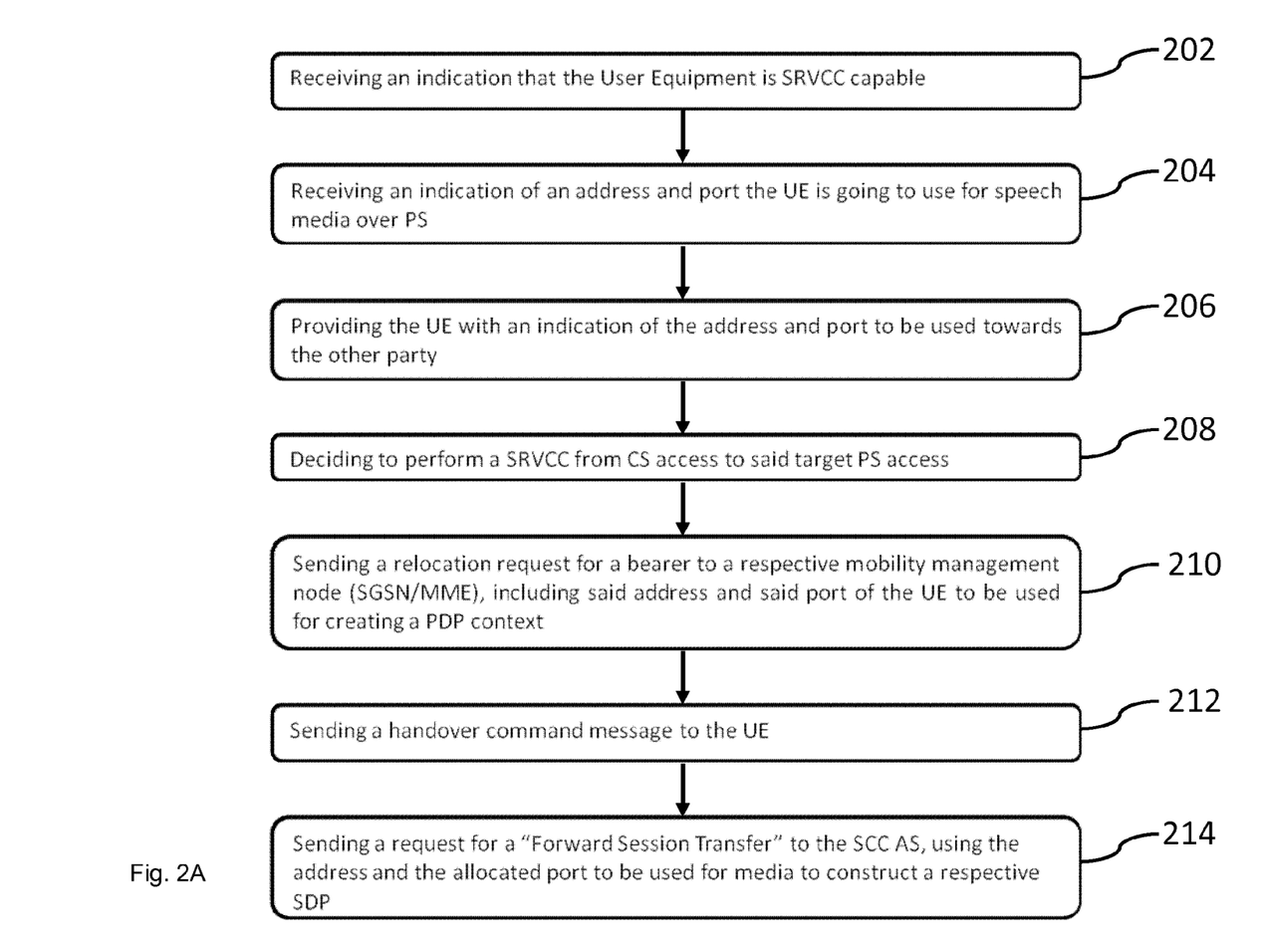
FIG. 2A shows a flowchart illustrating a method for a call control node allowing for a handover from a circuit switched (CS) access to a target packet switched (PS) access (PS E-UTRAN/UTRAN HSPA) according to an exemplary embodiment of the invention.

Referring to FIG. 2A, a method for a call control node allowing a handover from a CS access to a packet switched access according to an exemplary embodiment of the invention is described.

In particular, the method allows for a session transfer of a call involving a User Equipment (UE) of a handover party from a circuit switched (CS) (particularly transferring-out leg) access towards a target packet switched (PS) (particularly transferring-in leg, further particularly PS E-UTRAN/UTRAN HSPA) access. The call involves the handover party and another party. The call is anchored in a Service Centralization and Continuity Application Server (SCC AS) of the IP-Multimedia-Subsystem (IMS).

The call control node (particularly an MSC Server) is enhanced for Single Radio Voice Call Continuity (SRVCC).

The method is executed by the call control node.

According to a block 202, the call control node receives an indication that the UE is SRVCC capable. Further, according to a block 204, the call control node receives an indication of an address and a port the UE is going to use for speech media over PS. According to a block 206, the UE is then provided with an indication of an address and a port to be used towards the other party, particularly a remote end. Next, according to a block 208, the call control node decides to perform a SRVCC from the CS access to the target PS access. According to a block 210, the call control node sends a relocation request for a bearer to a respective mobility management node, particularly to a SGSN in a first embodiment or MME in case of a E-UTRAN target access or to a SGSN in case of a UTRAN HSPA target access in a second embodiment, including the address and the port of the UE to be used for creating a EPS bearer/PDP context (particularly (including) a VoIP bearer). According to a block 212, the call control node sends a handover command message to the UE, and sends a request for a "Forward Session Transfer" to the SCC AS, using the address and the allocated port to be used for media to construct a respective SDP (block 214).

Further, the call control node may receive an indication that the target PS access supports Voice over IP (Internet Protocol). Further, the call control node may receive a relocation response. Further, the call control node may receive information pertaining to the EPS Bearer/PDP context and may send along said handover command message information pertaining to the EPS Bearer/PDP context (particularly (including) a VoIP bearer). Further, the decision of the call control node to perform SRVCC may be based on a handover request or a relocation request.

Figure 2B:
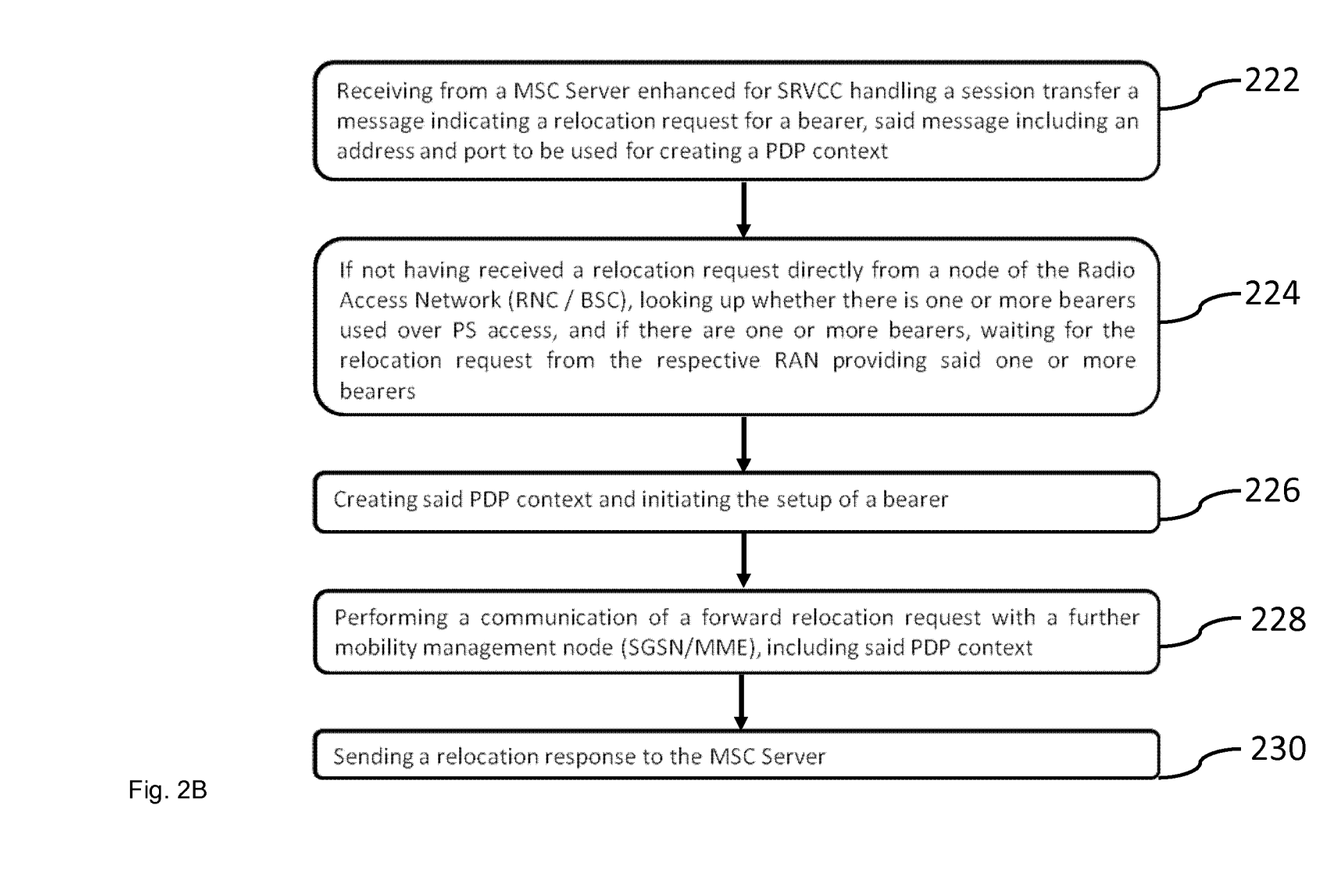
FIG. 2B shows a flowchart illustrating a method for a mobility management node allowing for a handover from a circuit switched (CS) access to a target packet switched access (PS E-UTRAN/UTRAN HSPA) according to an exemplary embodiment of the invention.

Referring to FIG. 2B, a method for a mobility management node allowing a handover from a CS access to a packet switched access according to an exemplary embodiment of the invention is described.

In particular, the method allows for a session transfer of a call involving a User Equipment (UE) of a handover party from a circuit switched (CS) (particularly transferring-out leg) access towards a target packet switched (PS) (particularly transferring-in leg, further particularly PS E-UTRAN/UTRAN HSPA) access. The call involves the handover party and another party. The call is anchored in a Service Centralization and Continuity Application Server (SCC AS) of the IP-Multimedia-Subsystem (IMS).

The mobility management node is particularly adapted as a serving GPRS support node (SGSN) or as a mobility management entity (MME).

The method is executed by the mobility management node.

According to a block 222, the mobility management node receives from a MSC Server enhanced for SRVCC handling the session transfer a message indicating a relocation request for a bearer, wherein the message includes an address and a port to be used for creating a PDP context/EPS bearer (particularly (including) a VoIP bearer). If the mobility management node does not have received a relocation request directly from a node of the Radio Access Network (RNC/BSC) in a first embodiment or from a PS source (SGSN) in a second embodiment, the mobility management node may look up whether there is one or more bearers used over PS access (block 224). If there are one or more bearers, the mobility management node may wait for the relocation request from the respective RAN providing the one or more bearers, if not having received such a request already. Next, according to a block 226, the mobility management node creates the PDP context (particularly (including) a VoIP bearer) and initiates the setup of a bearer. In particular, the mobility management node may create the PDP context (particularly (including) a VoIP bearer)/EPS bearer and in a first embodiment may send a complete relocation request to the target side or in a second embodiment may initiate the setup of a radio bearer. In particular, the mobility management node may create a "fictive" PDP context that will be used as a "real" bearer for VoIP once the call has been handed over to the target network. According to a block 228, the mobility management node performs a communication of a forward relocation request with a further mobility management node, particularly with a SGSN or a MME, including said PDP context. Further, according to a block 230, the mobility management node sends a relocation response to the MSC Server.

The mobility management node may be a serving node acting within the transfer as source mobility management node. The mobility management node may be a node acting within the transfer as target mobility management node.

Initiating the setup of the (particularly VoIP) bearer may comprise sending respective information towards a target mobility management node.

Figure 2C:
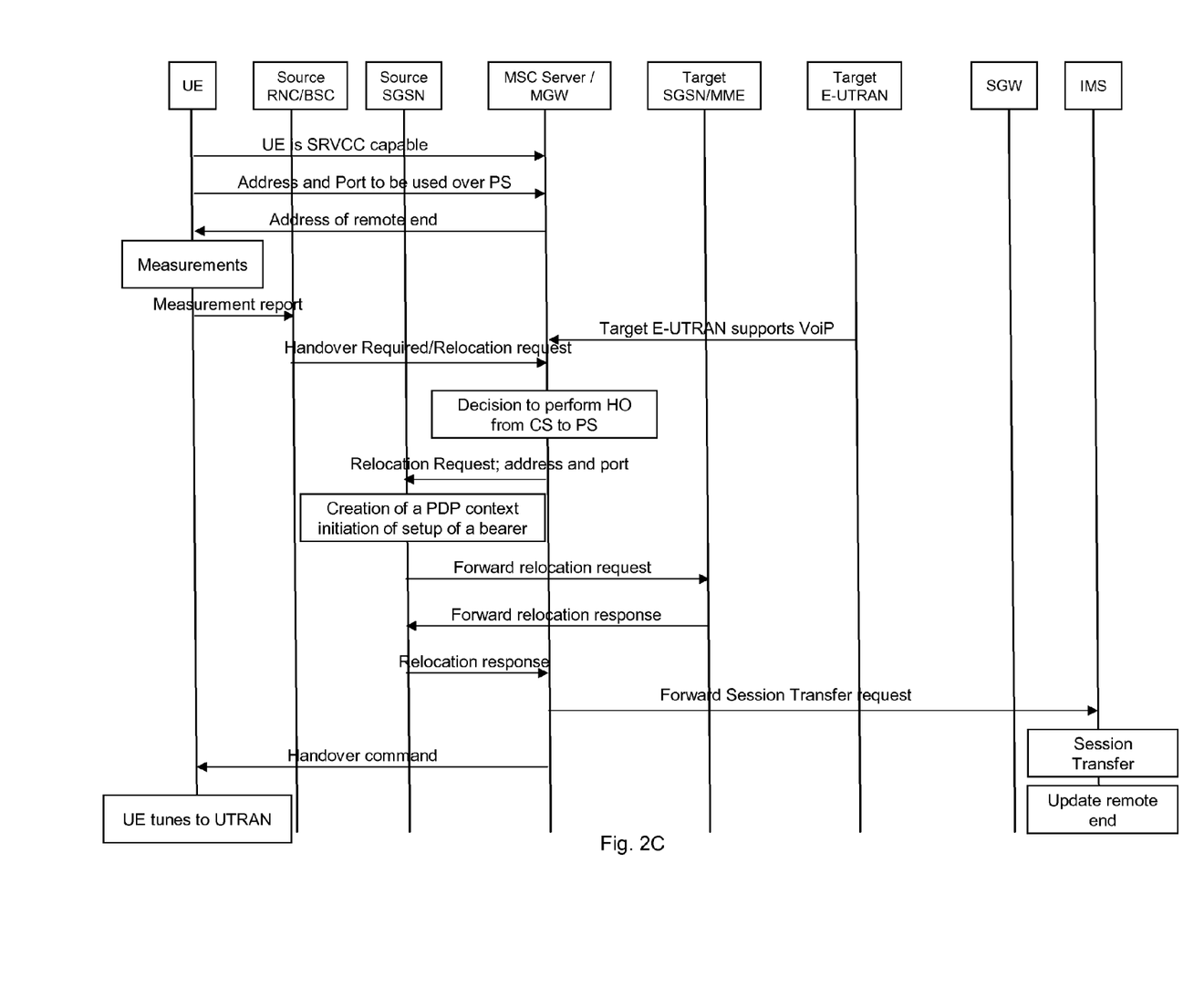
FIG. 2C shows a flowchart illustrating a handover from a UTRAN/GERAN CS system to an EPS system (E-UTRAN) according to an exemplary embodiment of the invention.

In the following a first embodiment is described with reference to FIG. 2C.

For the following it may be assumed—although not being limited thereto—that a source PS system does not support conversational bearer, otherwise the UE could establish a VoIP session over PS instead of a CS service.

In the beginning, a MSC serving a User Equipment has received an indication that said User Equipment is capable of Single Radio Voice Call Continuity (SRVCC). This may be done by the UE itself, e.g. during an attachment procedure, the UE may indicate that it is SRVCC capable.

Now, it is assumed for the following that the UE has an ongoing call. The call may be mobile originated or mobile terminated. The call is anchored in the Service Centralization and Continuity Application Server (SCC AS).

It is furthermore assumed that the UE has informed the MSC about the address and port it would use for media over PS while the MSC has informed the UE about the address of the remote end. The addresses may be IP addresses and the ports may be UDP ports.

In particular, the MSC learns about the UE's address and port it would use for media over PS while the UE learns about the address and port of the remote end.

The address and port of the UE are later-on of used when MSC constructs the SDP enabling use of E-UTRAN.

If the UE has already a SIP dialogue, then it already knows an address and could allocate in advance a port for the audio or a default port may be used and communicated to the MSC.

However, if the UE has no SIP dialogue, then a possible solution is to use an appropriate message for example using USSD between UE and MSC Server to exchange the addresses and other information.

The MSC could query a serving SGSN, e.g. via a Gs interface. The serving SGSN could ask a respective GGSN/PGW for the address of the user. Again a default UDP port could be used.

Alternatively, the MSC has a SIP interface. Then the user may be registered in the IP Multimedia Subsystem (IMS) via the MSC Server enhanced for SRVCC.

Based on measurement reports send by the UE, the source BSC will send a handover required message if the UE is in GERAN or the RNC will send a relocation required message or a relocation request message if the UE is in UTRAN to the MSC. If the UE has besides the conversational bearer for a circuit switched voice call also other bearers, e.g., for interactive traffic, the source RAN (GERAN/UTRAN) sends also a handover required/relocation required to the source SGSN.

After receiving the handover required/relocation required message, the serving MSC may decide to perform a SRVCC from CS to target PS system. The decision may be exemplary triggered by or based on a handover required send by a BSC involved in a call, or due to a relocation required received from the RNC involved in a call. The MSC Server may also receive information that the target cell supports VoIP only.

This information may be provisioned by the BSC or the RNC as well, particularly within the handover request/relocation message.

The MSC Server sends a relocation request for a bearer to the source SGSN, including addresses and the ports to be used for creating a fictive PDP context (VoIP bearer). The bearer may be a conversational bearer or other suitable bearer. The address may be an IP address and the port may be an UDP port.

If the source SGSN does not yet have received a relocation request from source RNC or BSC, the source SGSN may perform a look up of existing bearers used over PS access.

If there are no bearers, then the source SGSN does not need to wait for a relocation request. However, if there are one or more bearers, the source SGSN should wait for the relocation request from the source RAN.

The source SGSN creates a fictive PDP context (VoIP/conversational bearer) e.g. according to normal activation procedures (see 3GPP Technical Specification 23.060 or 23.401) while there is no need for involvement of the User Equipment. The PDP context will be used by the target system when allocating resources. The source SGSN creates a relocation request including the bearer and if there are existing bearers over PS than these other bearers over PS should also be subject to a relocation.

The source SGSN sends a forward relocation request to a target SGSN (in case of UTRAN HSPA) or a target MME (in case of E-UTRAN), including potential ongoing PDP contexts and the fictive PDP context.

After performing necessary interaction with the RNC/eNodeB, the target SGSN/MME may respond with a forward relocation response to the source SGSN.

The source SGSN sends a relocation response to the MSC Server which in turn sends a handover command message to the UE. The HO Command message shall contain information about the PDP context created by the target SGSN and may contain address and port of the remote end if not learnt by other means. This can also be understood as an implicit indication that CS to PS Handover shall occur.

The handover command that is sent to the UE may be accomplished by sending a handover command from the MSC Server/MGW to the Source RNC/BSC and/or from the Source SGSN to the Source RNC/BSC. From the Source RNC/BSC it can be then sent to the UE.

The MSC Server sends a "Forward Session Transfer" request to the SCC AS, using the address and the allocated port to be used for speech media to construct the SDP. This request may be send upon receipt of the relocation response message or already after sending the relocation request.

When receiving the "Forward Session Transfer" request, the SCC AS will prepare the transferring-out leg and update the remote end.

The UE tunes to the target PS system (UTRAN HSPA or E-UTRAN), using the information received in the handover command message to the UE. In particular, the UE will "jump" into a SIP voice session. It will send out RTP traffic using the address and port of the remote end; it will receive traffic on its address and port. In the case of IP addresses and UDP ports, the traffic may be transported by an appropriate protocol such as RTP.

Other media, e.g. described above as exiting PS bearers, if present on the transferring-out PS domain, may continue due to PS handover.

Figure 2D:
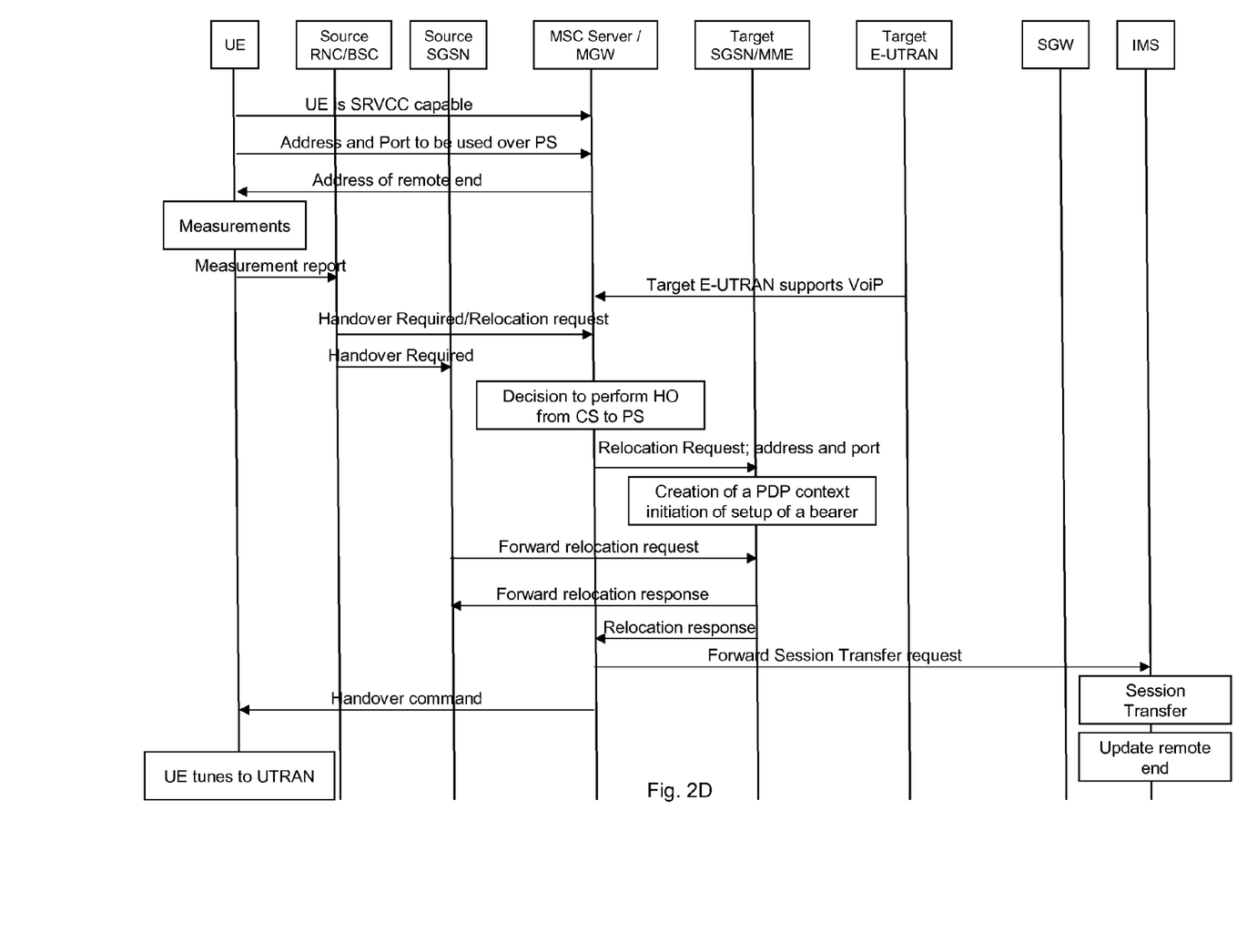
FIG. 2D shows a flowchart illustrating a handover from a UTRAN/GERAN CS system to an EPS system (E-UTRAN) according to an exemplary embodiment of the invention.

In the following an alternative embodiment is described with reference to FIG. 2D. The main difference within said embodiment is that the functions described above with respect to the source system can likewise be handled by the target system. Instead of going via a source SGSN, the MSC is configured with tables to find the target MME/SGSN and sends the relocation request directly to target MME/SGSN, which will allocate an EPS bearer/PDP context. This can transparently be sent backwards.

Within the following description, it is assumed that the same steps up to the decision as described above are already performed.

The serving MSC Server decides to perform a SRVCC from CS to target PS system. The decision may be exemplary triggered by or based on Handover required send by a BSC involved in a call, or due to a relocation request received from the RNC involved in a call. The MSC Server may also receive information that the target cell supports VoIP only. This information may be provisioned to the BSC or the RNC as well.

The MSC Server sends a relocation request for a bearer to the target SGSN/MME, including addresses and the ports to be used for creating the PDP context/EPS bearer (VoIP bearer). The bearer may be a conversational bearer. The address may be an IP address and the port may be an UDP port.

If the target MME/SGSN does not yet have received a relocation request from source SGSN, the target MME/SGSN may perform a look up of existing bearers used over source PS access/RAN.

If there are no bearers, then the target MME/SGSN does not need to wait for a relocation request. However, if there are one or more bearers, the target SGSN/MME should wait for the relocation request from the source RAN.

The target SGSN/MME creates a PDP context/EPS Bearer (VoIP bearer) e.g. according to normal activation procedures (see 3GPP Technical Specification 23.060 or 23.401) while there is no need for involvement of the User Equipment. The target SGSN/MME used the PDP context/EPS Bearer to allocate resources needed in the target system.

If having received a forward relocation request from the source SGSN, the target SGSN/MME sends a forward relocation response to the source SGSN.

The MSC Server once informed of the (forward) relocation response sends a handover command message to the UE. The HO Command message shall contain information about the allocated EPS bearer/PDP context created by the target MME/SGSN and may contain the address and port of the remote end unless not learnt by other means. This can also be understood as an implicit indication that CS to PS Handover shall occur.

The handover command that is sent to the UE may be accomplished by sending a handover command from the MSC Server/MGW to the Source RNC/BSC and/or from the Source SGSN to the Source RNC/BSC. From the Source RNC/BSC it can be then sent to the UE.

The MSC Server sends a "Forward Session Transfer" request to the SCC AS, using the address and the allocated port to be used for speech media to construct the SDP (Session Description Protocol). This request may be send upon receipt of the relocation response message or already after sending the relocation request.

When receiving the "Forward Session Transfer" request, the SCC AS will prepare the transferring-out leg and update the remote end.

The UE tunes to the target PS system (UTRAN HSPA or E-UTRAN), using the information received in the handover command message to the UE. In particular, the UE will "jump" into a SIP voice session. The UE will send out RTP traffic using the address and port of the remote end; it will receive traffic on its address and port. In the case of IP addresses and UDP ports, the traffic is transported by an appropriate protocol such as RTP.

Other media, e.g. described above as exiting PS bearers, if present on the transferring-out PS domain, may continue due to PS handover.

Figure 3:
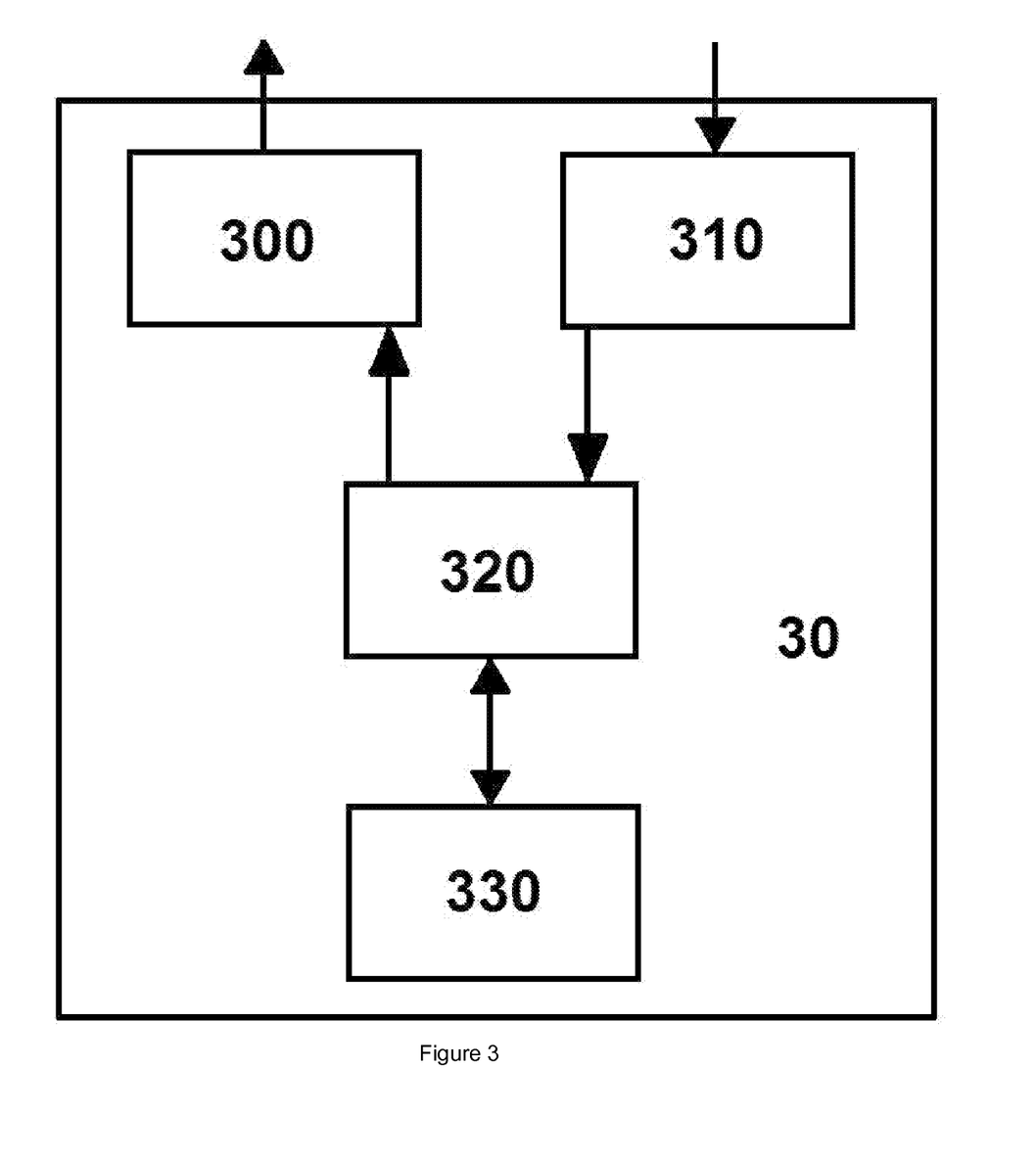
FIG. 3 shows an exemplary structure of a call control node enhanced for SRVCC embodying the invention.

FIG. 3 shows an exemplary structure of a call control node such as an MSC Server (30) enhanced for SRVCC allowing for a session transfer of a call involving a User Equipment (UE) of a handover party from a circuit switched (CS) (particularly transferring-out leg) access towards a target packet switched (PS) (particularly transferring-in leg, further particularly PS/HS/LTE) access, the call involving said handover party and another party, said call being anchored in an Service Centralization and Continuity Application Server (SCC AS) of the IP-Multimedia-Subsystem (IMS) embodying the invention. Said call control node (30) is involved in a session transfer for a call from a source RAN (CS) to a target RAN (UTRAN HSPA/E-UTRAN).

The call control node (30) is equipped with Means for receiving (310) an indication that the User Equipment is SRVCC capable. Furthermore, said means for Receiving may further be adapted to receive an indication of an address and port the UE is going to use for speech media over PS.

Said receiving means (310) may be embodied in a receiver.

Furthermore, the call control node (30) is equipped with means for sending (300). These sending means may be adapted to provision the UE with an indication of the address and port to be used towards the other party (particularly a remote end). Said means for sending (300) may further be adapted to send a relocation request for a bearer to a respective mobility management node (SGSN/MME), including said address and said port of the UE to be used for creating a PDP context (particularly (including) a VoIP bearer). Said means for sending (300) may further be adapted to send a request for a "Forward Session Transfer" to the SCC AS, using the address and the allocated port to be used for media to construct a respective SDP. Said means for sending (300) may further be adapted to send a handover command message to the UE.

Said sending means (300) may be embodied in a transmitter.

Furthermore, all embodiments of the call control node (30) may comprise processing means (320) for evaluation or determination of various conditions as described above. Inter alia, said means for processing (320) may allow for deciding to perform a SRVCC from CS access to said target PS access. The means for processing (320) may comprise means for deciding to perform a SRVCC from CS access to said target PS access.

Said processing means (320) may be embodied in a processor, an ASIC (Application Specific Circuit) or an FPGA (Field Programmable Gate Array).

In a further embodiment, said means for receiving (310) may further be adapted to receive an indication that the target PS access supports Voice over Internet Protocol.

Still further embodiments may envisage that within the aforementioned embodiments said means for receiving (310) are further adapted to receive a relocation response.

Still further embodiments may envisage that within the aforementioned embodiments said means for receiving (310) are further adapted to receive information pertaining to the PDP context and said means for sending (300) are further adapted to receive along said handover command message information pertaining to the PDP context (particularly (including) a VoIP bearer).

In yet other embodiment, it may be envisaged that within the aforementioned embodiments the decision is based on a measurement report or a relocation request.

In still further embodiments of the call control node (30), a storing means (330) for storing various parameters such as call related routing information of the source and/or target RAN are provisioned. Said storing means (330) may be embodied in any kind of memory such as RAM.

Figure 4:
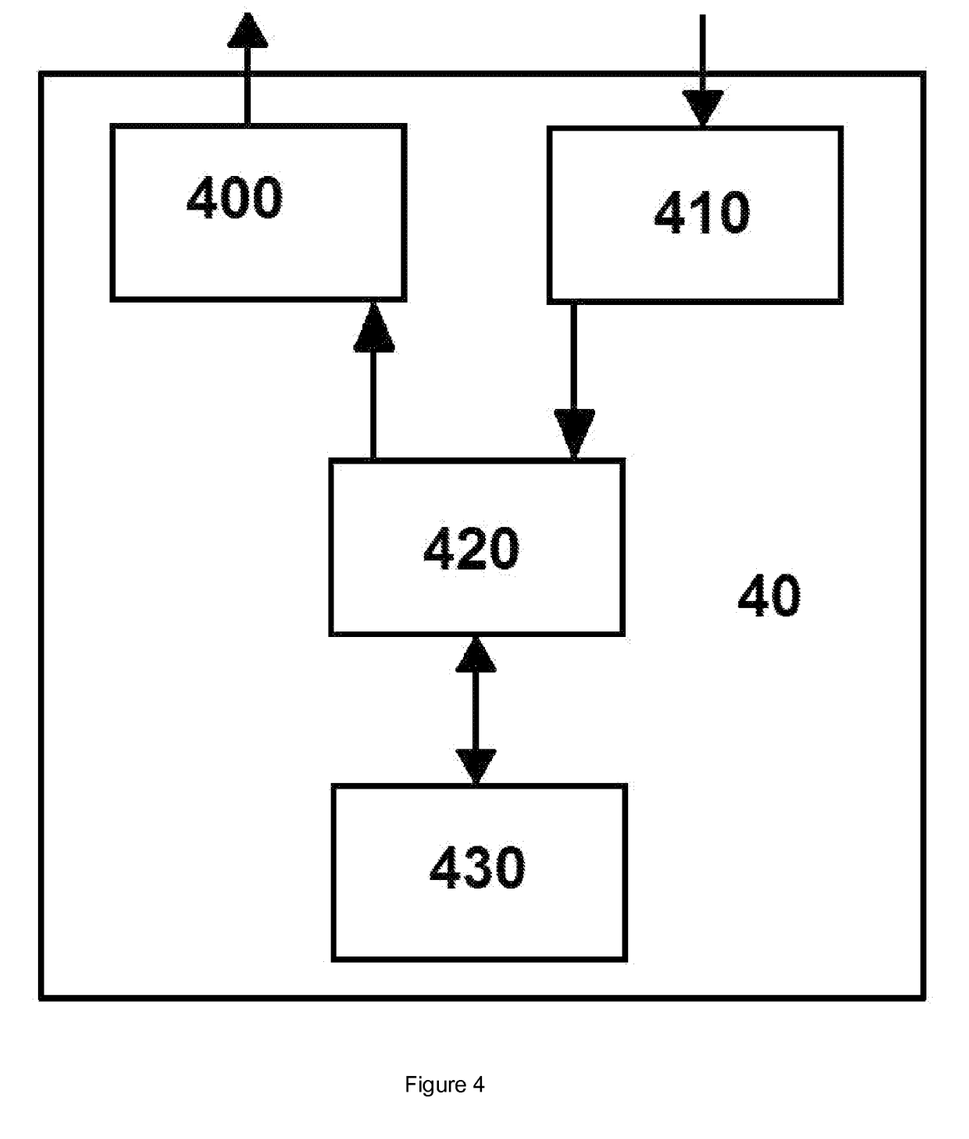
FIG. 4 shows an exemplary structure of a mobility management node embodying the invention.

FIG. 4 shows an exemplary structure of a mobility management node (SGSN/MME) allowing for a session transfer of a call involving a User Equipment (UE) of a handover party from a circuit switched (CS) (particularly transferring-out leg) access towards a target packet switched (PS) (particularly transferring-in leg, further particularly PS UTRAN HSPA/E-UTRAN) access, the call involving said handover party and another party, said call being anchored in an Service Centralization and Continuity Application Server (SCC AS) of the IP-Multimedia-Subsystem (IMS) embodying the invention.

Said mobility management node (40) comprises means for receiving (410) from a call control node such as an MSC Server enhanced for SRVCC handling said session transfer a message indicating a relocation request for a bearer, said message including an address and a port to be used for creating a PDP context (particularly (including) a VoIP bearer).

Said receiving means (410) may be embodied in a receiver.

Furthermore, said mobility management node (SGSN/MME) (40) comprises means for processing (420) optionally adapted to looking up whether there is one or more bearers used over PS access if not having received a relocation request directly from an node of the Radio Access Network (RNC/BSC), and if there are one or more bearers, further optionally adapted to wait for the relocation request from the respective RAN providing said one or more bearers. Said means for processing (420) are further adapted to create said PDP context (particularly (including) a VoIP bearer) and initiating the setup of a bearer.

Said processing means (420) may be embodied in a processor, an ASIC or an FPGA.

In addition, said mobility management node (40) comprises means for performing (400) a communication of a forward relocation request with a further mobility management node (SGSN/MME), including said PDP context.

Said means for performing (400) may be adapted for sending a forward relocation request towards a further mobility management node (SGSN/MME), including said PDP context.

Said means for performing (400) may be further adapted to send a relocation response to the MSC Server.

Said performing means (400) may be embodied in a transmitter.

Said means for performing (400) are adapted for receiving a forward relocation request from a further mobility management node (SGSN/MME), including said PDP context.

Said performing means (400) may be embodied in a receiver.

In further embodiments, said mobility management node (SGSN/MME) (40) is either a serving node acting within the transfer as source mobility management node or a node acting within the transfer as target mobility management node.

In still further embodiments, the mobility management node (SGSN/MME) (40) is a serving node acting within the transfer as source mobility management node and the means for sending (400) are further adapted to send respective information towards a target mobility management node.

Although the invention has been described with respect to different physical entities, it is apparent to a person skilled in the art that some or all functionality provided may be embodied in software or software enabled devices.

It is furthermore apparent that although several entities have been described as separate this is done merely for clarification of the logical relationship rather than a physical relationship. Obviously, several entities may be embodied in a single unit such as a transmitter and a receiver. Furthermore, even source and target mobility management nodes may be physically the same however with respect to their function towards different access domains they are treated as separate entities.

By means of the invention, it is now enabled to return form a CS access towards a High Speed/LTE packet access. Furthermore, the invention may also provide a solution for a session transfer of calls which originated in the CS domain.

ABBREVIATIONS eNB eNode B
EPC Evolved Packet Core
EPS Evolved Packet System
ICS IMS Centralized Services
SRVCC Single Radio Voice Call Continuity
STI Session Transfer URI (according to 23.237)
STN Session Transfer Number
E-UTRAN or eUTRAN Evolved UTRAN

REFERENCES

3GPP Technical Specification 23.216 SRVCC
3GPP Technical Specification 23.292 IMS Centralized Services
3GPP Technical Specification 23.237 IMS Service Continuity

The invention claimed is:

1. A method implemented by a call control node enhanced for Single Radio Voice Call Continuity (SRVCC) for allowing a session transfer of a call involving a User Equipment (UE) of a handover party from a circuit switched (CS) access towards a target packet switched (PS) access, the call involving said handover party and another party, said call being anchored in an Service Centralization and Continuity Application Server (SCC AS) of an IP-Multimedia-Subsystem (IMS), the method comprising:
receiving at the call control node an indication that the UE is SRVCC capable, wherein the call control node is in a core network for said CS access;
receiving at the call control node an indication of an address and port the UE is going to use for speech media over PS access;
providing the UE with an indication of an address and port of the other party;
deciding at the call control node to perform a SRVCC from said CS access to said target PS access;
sending a relocation request for a bearer from the call control node to a respective mobility management node, said relocation request including said address and said port of the UE, to be used for creating a PDP context, wherein said respective mobility management node is either in the core network for said CS access or in a core network for said target PS access,
sending from the call control node to the UE a handover command message that indicates CS to PS handover shall occur, and
sending a request for a Forward Session Transfer from the call control node to the SCC AS, using the address and the port the UE is going to use for speech media over PS access to construct a respective Session Description Protocol (SDP).

2. The method of claim 1, further comprising receiving an indication that the target PS access supports Voice over Internet Protocol (VoIP).

3. The method of claim 1, further comprising receiving a relocation response.

4. The method of claim 1, further comprising receiving information pertaining to the PDP context and sending that information to the UE by including the information within the handover command message.

5. The method of claim 1, wherein the decision to perform SRVCC is based on a handover required message or a relocation request.

6. A method for a first mobility management node for allowing a session transfer of a call involving a User Equipment (UE) of a handover party from a circuit switched (CS) access towards a target packet switched (PS) access, the call involving said handover party and another party, said call being anchored in an Service Centralization and Continuity Application Server (SCC AS) of an IP-Multimedia-Subsystem (IMS), the method comprising:
receiving, from a MSC Server that is enhanced for Single Radio Voice Call Continuity (SRVCC) and is handling said session transfer based on the MSC Server having received an indication that the UE is SRVCC capable, a message indicating a relocation request for a bearer, said message including an address and a port to be used for creating a PDP context;
creating said PDP context and initiating the setup of a bearer;
sending a forward relocation request towards, or receiving a forward relocation request from, a second mobility management node different than the first mobility management node, the forward relocation request including said PDP context, wherein the first mobility management node is in a core network for one of said CS access and said target PS access and the second mobility management node is in a core network for the other one of said CS access and said target PS access; and
sending a relocation response to the MSC Server.

7. The method according to claim 6, further comprising:
if the first mobility management node has not also received a relocation request directly from a node of a Radio Access Network (RAN), looking up whether the UE is using one or more bearers over PS access, and
if the UE is using one or more bearers over PS access, waiting for the relocation request from the respective RAN providing said one or more bearers.

8. The method according to claim 6, comprising sending the forward relocation request towards the second mobility management node, wherein the second mobility management node acts as a target mobility management node.

9. The method according to claim 6, wherein the first mobility management node is a serving node acting within the transfer as a source mobility management node.

10. The method according to claim 6, comprising receiving the forward relocation request from the second mobility management node, wherein the second mobility management node acts as a source mobility management node.

11. The method according to claim 6, wherein the first mobility management node is a node acting within the transfer as target mobility management node.

12. The method according to claim 6, wherein initiating the setup of a bearer comprises sending respective information for setup of the bearer towards the second mobility management node.

13. A call control node enhanced for Single Radio Voice Call Continuity (SRVCC) and configured to allow a session transfer of a call involving a User Equipment (UE) of a handover party from a circuit switched (CS) access towards a target packet switched (PS) access, the call involving said handover party and another party, said call being anchored in an Service Centralization and Continuity Application Server (SCC AS) of an IP-Multimedia-Subsystem (IMS), the call control node in a core network for said CS access and comprising:
 a receiver configured to receive an indication that the User Equipment (UE) is SRVCC capable, and to receive an indication of an address and port the UE is going to use for speech media over PS access;
 a transmitter configured to provision the UE with an indication of an address and port of the other party;
 a processor configured to decide to perform a SRVCC from CS access to said target PS access;
 wherein the transmitter is further configured to:
  send a relocation request for a bearer to a respective mobility management node, said relocation request including said address and said port of the UE, to be used for creating a PDP context, wherein said respective mobility management node is either in the core network for said CS access or in a core network for said target PS access,
  send to the UE a handover command message that indicates CS to PS handover shall occur, and
 send a request for a Forward Session Transfer to the SCC AS, using the address and the port the UE is going to use for speech media over PS access to construct a respective Session Description Protocol (SDP).

14. The call control node of claim 13, wherein the receiver is further configured to receive an indication that the target PS access supports Voice over Internet Protocol (VoIP).

15. The call control node of claim 13, the receiver is further configured to receive a relocation response.

16. The call control node of claim 13, wherein the receiver is further configured to receive information pertaining to the PDP context and wherein the transmitter is further configured to send that information to the UE by including the information within the handover command message.

17. The call control node of claim 13, wherein the decision is based on a handover required message or a relocation request.

18. A first mobility management node configured to allow a session transfer of a call involving a User Equipment (UE) of a handover party from a circuit switched (CS) access towards a target packet switched (PS) access, the call involving said handover party and another party, said call being anchored in an Service Centralization and Continuity Application Server (SCC AS) of an IP-Multimedia-Subsystem (IMS), the first mobility management node comprising:
 a transmitter;
 a receiver configured to receive, from a MSC Server that is enhanced for SRVCC and is handling said session transfer based on the MSC Server having received an indication that the UE is SRVCC capable, a message indicating a relocation request for a bearer, said message including an address and a port to be used for creating a PDP context; and
 a processor configured to create said PDP context and to initiate the setup of a bearer;
 wherein either the transmitter is configured to send a forward relocation request towards, or the receiver is configured to receive a forward relocation request from, a second mobility management node different than the first mobility management node, the forward relocation request including said PDP context, wherein the first mobility management node is in a core network for one of said CS access and said target PS access and the second mobility management node is in a core network for the other one of said CS access and said target PS access; and
 wherein the transmitter is configured to send a relocation response to the MSC Server.

19. The first mobility management node according to claim 18, wherein the processor is further configured to:
 if the first mobility management node has not also received a relocation request directly from a node of a Radio Access Network (RAN), look up whether the UE is using one or more bearers over PS access, and
 if the UE is using one or more bearers over PS access, wait for the relocation request from the respective RAN providing said one or more bearers.

20. The first mobility management node according to claim 18, wherein the transmitter is configured to send the forward relocation request towards the second mobility management node, wherein the second mobility management node acts as a target mobility management node.

21. The first mobility management node according to claim 18, wherein the first mobility management node is a serving node acting within the transfer as source mobility management node.

22. The first mobility management node according to claim 18, wherein for the receiver is configured to receive the forward relocation request from the second mobility management node, wherein the second mobility management node acts as a source mobility management node.

23. The first mobility management node according to claim 18, wherein the first mobility management node is a node acting within the transfer as a target mobility management node.

24. The first mobility management node according to claim 18, wherein the processor is configured to initiate setup of the bearer by sending, via the transmitter, respective information for setup of the bearer towards the second mobility management node.

25. The method according to claim 1, wherein sending a relocation request for a bearer to a respective mobility management node comprises sending the relocation request indirectly to the respective mobility management node.

26. The method according to claim 6, wherein receiving said message from the MSC Server comprises receiving said message indirectly from the MSC Server.

27. The call control node according to claim 13, wherein the transmitter is configured to send the relocation request for a bearer indirectly to the respective mobility management node.

28. The first mobility management node according to claim 18, wherein the receiver is configured to receive said message indirectly from the MSC Server.

29. The method of claim 1, wherein said call control node comprises either a Mobile Switching Center (MSC) or an MSC Server, and wherein either:
 said target PS access comprises High Speed Packet Access (HSPA) access and said respective mobility management node comprises a Serving GPRS Support Node (SGSN); or said target PS access comprises Evolved UTRAN (E-UTRAN) access and said respective mobility management node comprises a Mobility Management Entity (MME).

30. The method of claim 6, wherein either:

said target PS access comprises High Speed Packet Access (HSPA) access and one of said first and second mobility management nodes comprises a Serving GPRS Support Node (SGSN); or said target PS access comprises Evolved UTRAN (E-UTRAN) access and one of said first and second mobility management nodes comprises a Mobility Management Entity (MME).

* * * * *